(12) United States Patent
Thoms

(10) Patent No.: US 8,946,654 B2
(45) Date of Patent: Feb. 3, 2015

(54) METHOD AND APPARATUS FOR READING OUT IMAGE INFORMATION STORED IN A STORAGE PHOSPHOR OF A STORAGE MEDIUM

(76) Inventor: Michael Thoms, Bietigheim-Bissingen (DE)

( * ) Notice: Subject to any disclaimer, the term of this patent is extended or adjusted under 35 U.S.C. 154(b) by 84 days.

(21) Appl. No.: 13/217,320

(22) Filed: Aug. 25, 2011

(65) Prior Publication Data

US 2012/0119111 A1 May 17, 2012

(30) Foreign Application Priority Data

Aug. 25, 2010 (DE) .......................... 10 2010 039 733
Dec. 23, 2010 (DE) .......................... 10 2010 064 136

(51) Int. Cl.
*F21V 9/16* (2006.01)
*H05B 33/00* (2006.01)
*G21K 4/00* (2006.01)
*H04N 1/04* (2006.01)
*G03B 42/02* (2006.01)
*G03B 42/08* (2006.01)

(52) U.S. Cl.
CPC .............. *H04N 1/0402* (2013.01); *G03B 42/02* (2013.01); *G03B 42/08* (2013.01); *H04N 1/0411* (2013.01); *H04N 1/0414* (2013.01); *H04N 1/0443* (2013.01); *H04N 1/0455* (2013.01); *H04N 2201/04756* (2013.01)
USPC ....................... 250/459.1; 250/484.4; 250/580

(58) Field of Classification Search
USPC ........... 250/484.4, 580, 581, 459.1, 582, 583, 250/584, 585, 586, 587
See application file for complete search history.

(56) References Cited

U.S. PATENT DOCUMENTS

| | | | |
|---|---|---|---|
| 4,315,318 A | 2/1982 | Kato et al. | |
| 4,527,060 A | 7/1985 | Suzuki et al. | |
| 4,692,813 A | 9/1987 | Conrad et al. | |
| 4,859,849 A | 8/1989 | Shimura et al. | |
| 5,311,032 A | 5/1994 | Montoro et al. | |
| 6,303,923 B1 * | 10/2001 | Wadsworth et al. | .... 250/214 LA |
| 6,580,525 B1 * | 6/2003 | Iwakiri et al. | ................. 358/471 |
| 2001/0012386 A1 * | 8/2001 | Struye et al. | .................. 382/131 |
| 2002/0040973 A1 | 4/2002 | Arakawa | |
| 2003/0057386 A1 | 3/2003 | Imai et al. | |
| 2010/0226557 A1 * | 9/2010 | Struye et al. | .................. 382/132 |

FOREIGN PATENT DOCUMENTS

| | | | |
|---|---|---|---|
| EP | 0 077 677 B2 | 2/1986 | |
| EP | 0 182 099 A1 | 5/1986 | |
| EP | 000295477 A2 * | 5/1988 | ............... G09G 3/30 |
| EP | 0 599 128 A2 | 6/1994 | |

\* cited by examiner

*Primary Examiner* — David Porta
*Assistant Examiner* — Kenneth J Malkowski
(74) *Attorney, Agent, or Firm* — Laurence A. Greenberg; Werner H. Stemer; Ralph E. Locher

(57) ABSTRACT

A method for reading out image information stored in a storage phosphor of a storage medium includes moving a light beam over the storage medium. A luminescence signal is generated by the photostimulation of the storage phosphor. In first time intervals a respective output value is determined from the luminescence signal, and a respective pixel value of an image pixel of a digital image is determined from the output value. The output value is thereby determined by addition of a plurality of measurement values of the luminescence signal which are detected in second time intervals lying within the first time interval. A corresponding apparatus for carrying out the method is described as well.

17 Claims, 11 Drawing Sheets

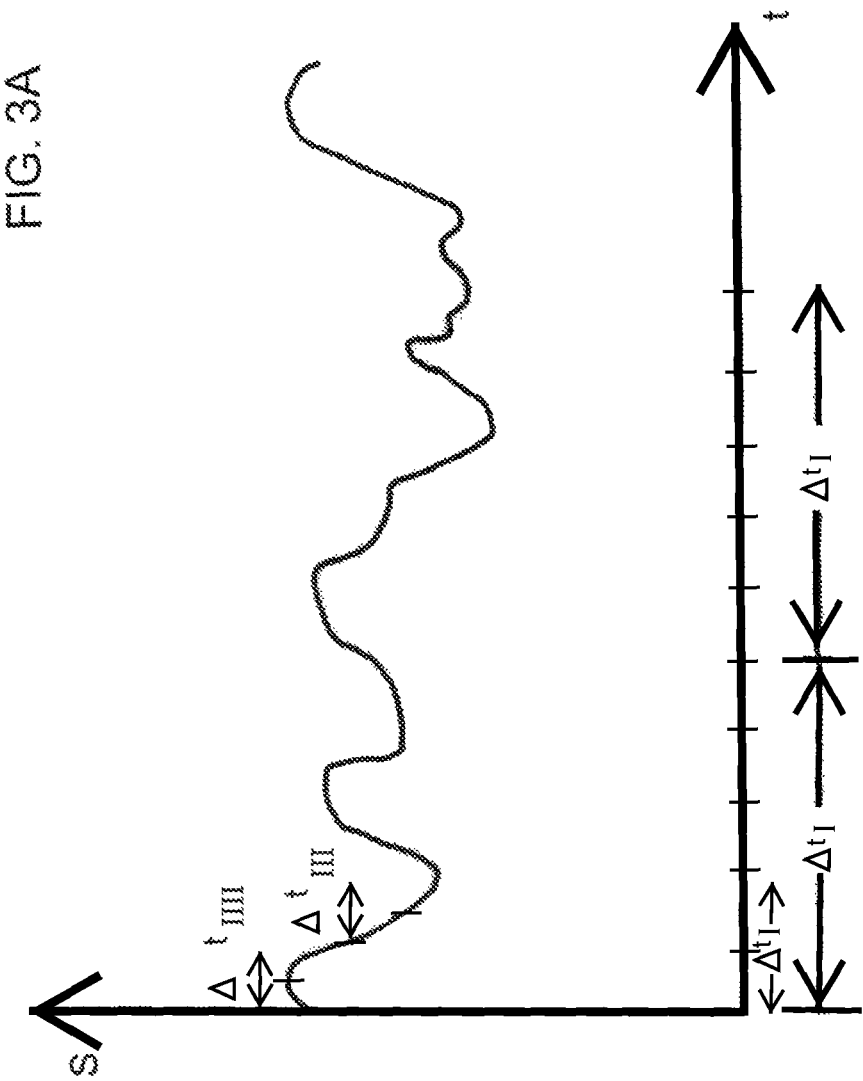

METHOD AND APPARATUS FOR READING OUT IMAGE INFORMATION STORED IN A STORAGE PHOSPHOR OF A STORAGE MEDIUM

CROSS-REFERENCE TO RELATED APPLICATION

This application claims the priority, under 35 U.S.C. §119, of German patent applications Nos. DE 10 2010 039 733.4, filed Aug. 25, 2010, and DE 10 2010 064 136.7, filed Dec. 23, 2010; the prior applications are herewith incorporated by reference in their entirety.

BACKGROUND OF THE INVENTION

Field of the Invention

The invention relates to a method and an apparatus for reading out image information stored in a storage phosphor of a storage medium.

In computer radiography, in order to read out latent X-ray images which contain a multiplicity of items of image information and have previously been stored in a storage phosphor of a storage medium, for example of a storage film, use is made of scanning of the image information stored in the storage film by way of a laser. A laser beam that is focused as finely as possible is thereby successively moved line by line over the storage medium, that is to say the storage film, until the entire storage film area has been scanned. The stored image information is present in the form of storage centers which contain photoelectrons and which are photostimulated under the action of the laser light in order subsequently to recombine and release part of the stored energy in the form of luminescence signals. The luminescence is thereby emitted with a temporal exponential decay curve. The decay time constant $\tau$ for the commercially used storage phosphor BaF-Br:EU$^{2+}$ is approximately 750 ns (cf. H. von Seggern, Brazilian Journal of Physics, vol. 29, no. 2, June 1999, 254).

Scanning methods of this type are described in the following: U.S. Pat. Nos. 4,692,813; 4,527,060 and its counterpart European patent EP 077 677 B1; U.S. Pat. No. 5,311,032 and its counterpart European patent application EP 05 99 128 A2; and in J. Miyahara et al., Nuclear Instruments and Methods in Physics Research A246 (1986), pages 572-578.

The luminescence signals initiated by photostimulation are fed via a light coupler to a photodetector, embodied as a photomultiplier. The photodetector converts the luminescence signal into an analog electrical signal. This electrical signal is fed to a downstream amplifier. The output signal of the amplifier is detected at specific time separations by a sample-and-hold amplifier and the measurement values obtained thereby are converted into digital measurement values by means of an analog-to-digital converter. Each of said digital measurement values represents an output value determined from the luminescence signal in the manner described above, a respective pixel value of an image pixel or image point of a digital image being determined from said output value. Each individual output value is assigned in the space domain of the storage film to the X-ray dose of an image pixel of a digital image, the position of which corresponds to the position of the laser beam at the instant of the detection of the electrical signal.

On account of the decay time constant of approximately 750 ns, it is necessary, in order to avoid a superimposition of two successive output values assigned to adjacent pixels, for the time separation between determining the output value successively in first time intervals, that is to say detecting the luminescence signal or the electrical signal corresponding thereto, to be at least double to triple the decay time constant. As a result, the first time interval lies distinctively above one microsecond. If this limit were not taken into account and if the first time interval were reduced, this would result in a superimposition of successive pixel signals and lowering of the image information in the scanning direction of the laser beam. This would impair the image quality of the digital image with regard to the resolution that can be achieved.

There is the possibility of increasing the intensity range of the luminescence signals converted by the analog-to-digital converter and the associated X-ray exposures by virtue of the gain of the amplifier being variable or that an amplifier with a logarithmic characteristic curve is employed, as in U.S. Pat. No. 4,859,849 and its counterpart European published patent application EP 182 099 A1.

In accordance with the prior art, the storage film, after or during the process of scanning a line, is offset perpendicularly to this scanning direction (fast scanning direction), and the next line is then scanned. In this case, the line separation is chosen such that the scanning points form a square pixel raster (in this respect, see AAPM-Report No. 93, October 2006 from the American Association of Physicists in Medicine).

All of the read-out methods known from the prior art, however, have in common that the reproduction of the stored image information is impaired by noise.

SUMMARY OF THE INVENTION

It is accordingly an object of the invention to provide a method and a device for reading out image information stored in the luminescent storage material of a storage medium which overcome the above-mentioned disadvantages of the heretofore-known devices and methods of this general type and which provides for a cost-effective process and an apparatus for reading out image information that allows a higher signal-to-noise ratio of the output value, that is to say of the digitized luminescence signal.

With the foregoing and other objects in view there is provided, in accordance with the invention, a method of reading out image information stored in a storage phosphor of a storage medium, the method which comprises:

a) moving a light beam over the storage medium in order to generate a luminescence signal by photostimulation of the storage phosphor;

b) within first time intervals, determining a respective output value from the luminescence signal; and b1) thereby determining the output value by addition of a plurality of measurement values of the luminescence signal taken during second time intervals lying within the first time interval; and c) determining from the output value a respective pixel value of an image pixel of a digital image stored on the storage medium.

In other words, the objects of the invention are achieved by a method for reading out image information that is stored in a storage phosphor of a storage medium, wherein:

a light beam is moved over the storage medium in order to generate a luminescence signal by photostimulation of the storage phosphor;

in first time intervals a respective output value is determined from the luminescence signal, a respective pixel value of an image pixel of a digital image being determined from said output value; and the output value is determined by summing a plurality of measurement values of the luminescence signal which are detected in second time intervals lying within the first time interval.

Yet in other words: a defined number of successive measurement values are in each case summed in blocks. The number multiplied by the duration of the time separation between the individual detections of the measurement values, that is to say the duration of the second time interval, corresponds to the duration of the first time interval.

The invention is based on the following insight:

When the known read-out methods are used, the image information items respectively formed by absorption of X-ray quanta in the storage medium are detected with a different weight during read-out. Said weight is dependent on the temporal separation between the generation of the luminescence signal and the instant of the registration thereof by the photodetector. If an ideally focused laser beam sweeps over the scanning line at a constant speed, at the different instants different storage centers are excited to recombination by absorption of the laser beam. Consequently, the storage phosphor temporally emits light quanta which form a luminescence signal and the intensity curves of which decay exponentially with a time constant $\tau$. This decay behavior is then also reflected in the corresponding analog electrical signal of the photodetector. Since quantum processes are involved during the emission of the light quanta, quantum noise is superimposed on the curves, the quantum noise being all the higher, the smaller the number of quanta which are involved in the read-out process and can thus influence the measurements.

As a result of an increase in the number of detections of the luminescence signal in a given first time interval, the number of quanta involved in the read-out process is increased and the noise is thus reduced. As a result of the addition of the plurality of measurement values, a first time interval is then furthermore taken into consideration which, in terms of the order of magnitude, corresponds to the first time interval in accordance with the prior art, that is to say typically corresponds approximately to double to triple the decay time constant, such that a superimposition of two successive output values assigned to one image pixel is avoided.

In one preferred embodiment of the invention, the time separations in which the measurement values are detected, and, consequently, the second time interval, are less than the duration of triple the decay time constant, preferably less than the decay time constant, of the storage phosphor.

Preferably, measurement values of the luminescence signal are detected by a procedure in which:

the luminescence signal is registered by means of a photodetector and converted into an analog electrical signal, the electrical signal is detected in second time intervals $\Delta t_{II}$ by a sampling device, the analog measurement values thereby obtained are converted into digital measurement values by means of an A/D converter, the output value being determined from said digital measurement values.

The individual digital measurement values can be buffer-stored prior to their addition in a memory.

In a further preferred embodiment, the output signal is divided by a factor, such that said output signal is limited to a maximum value. Cost-effective digital processing is made possible as result, since only a maximum digitization depth is employed.

In a further preferred embodiment, the electrical signal is filtered before detection. This is effected by a low-pass filter, in particular by a first-order low-pass filter or a low-pass filter having a Gaussian impulse response. What is thereby achieved is that the analog electrical signal detected by the sampling device is averaged beforehand over an even longer temporal range in order to be able to detect even more photoelectrons from the photomultiplier and thus to reduce noise.

Furthermore, the electrical signal can be averaged before detection. What is thereby achieved is that each signal is detected equally and the variance in the degree of detection over all pixels with the temporal occurrence of the signal disappears.

In a further preferred embodiment, regions of the storage phosphor are photostimulated both in the line direction and in a direction perpendicular thereto and detection of the measurement values in the space domain is carried out at a smaller distance in the line direction than perpendicularly to the line direction.

With the above and other objects in view there is also provided, in accordance with the invention, an apparatus for reading out image information stored in a storage phosphor of a storage medium, the apparatus comprising:

a photostimulation device for photostimulating the storage phosphor and generating a luminescence signal;

a measuring device configured for detecting the luminescence signal and outputting a measurement value; and a summation element for determining a respective output value by adding a plurality of measurement values.

The term "storage phosphor" should be understood in its broadest form, as understood by those of skill in the pertinent art, as referring to any suitable luminescent and photoluminescent material. Furthermore, the terms "downstream" and "upstream" as used herein refer to a direction of signal flow between the functional units of the apparatus.

Other features which are considered as characteristic for the invention are set forth in the appended claims.

Although the invention is illustrated and described herein as embodied in a method and apparatus for reading out image information stored in a storage phosphor of a storage medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3A shows a diagram illustrating the temporal profile of a luminescence signal S;

DETAILED DESCRIPTION OF THE INVENTION

As already explained above, when detection methods in accordance with the prior art are used, the image information items contained as a result of the absorption of X-ray quanta in the storage medium are detected with a different weight. Said weight is dependent on the temporal separation between the generation of the luminescence signal by means of the light beam and its detection.

Figure 1:
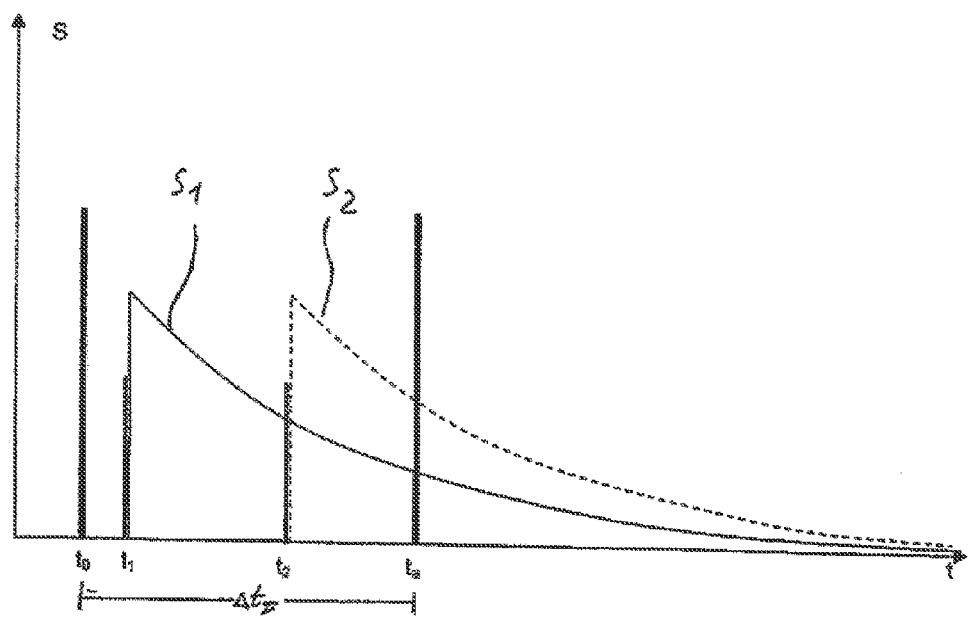
FIG. 1 shows a diagram demonstrating the decay behavior of a luminescence signal S.

Referring now to the figures of the drawing in detail and first, particularly, to FIG. 1 thereof, there is shown a schematic illustration of the time-dependent photostimulated luminescence signals $S_1$ and $S_2$—converted into a respective electrical signal by a photodetector—of two absorbed X-ray quanta in a time profile.

If an ideally focused laser beam sweeps at constant speed over the scanning line of the storage phosphor, the storage or luminescence centers generated by absorption of the X-ray quanta are excited to effect recombination in each case at the instants $t_1$ and $t_2$. Consequently, the storage phosphor temporally emits luminescence signals $S_1$, $S_2$ whose intensity curves decay exponentially with the time constant τ. The converted analog electrical signal of the photodetector, embodied as a photomultiplier, likewise decays exponentially with time.

Since quantum processes are involved during the emission of the luminescence signals, quantum noise is superimposed on the curves. The quantum noise is all the higher, the smaller the number of quanta which are involved in the respective process. The luminescence signal $S=S_1(t_a)+S_2(t_a)$ detected at a detection instant $t_a$ is therefore dependent, in terms of its magnitude for the two X-ray quanta, on the time separations $(t_a-t_1)$, and $(t_a-t_2)$, between the respective generation and the detection by means of the sampling device. Since the temporal position within a pixel is no longer distinguished, this results in additional noise in the signal level and thus in the detected luminescence signal, which propagates in the converted electrical signal.

If it is assumed that the luminescence signal S emitted by the luminescence centers of a single absorbed X-ray quantum upon photostimulation decays in the form $$S(t)=S_0 e^{-t/\tau} \quad (1)$$

then the average signal level results from averaging of the signal level detected at the instant $t_a$ over the first time interval $\Delta t_I$, which, in the exemplary embodiment in FIG. 1, lasts from an instant $t_0$ until the instant $t_a$:

$$\bar{S} = \frac{1}{\Delta t_I} \int_0^{\Delta t_a} S_0 e^{-t/\tau} dt \quad (2)$$

The standard deviation $\sigma_s$ and thus the noise in the signal value as a result of the position that is undefined relative to the sampling instant result on the basis of the relationship:

$$\sigma_S = \sqrt{\frac{1}{\Delta t_I} \int_0^{\Delta t_I} (S(t)-\bar{S})^2 dt} \quad (3)$$

The ratio of signal and noise also remains the same for subsequent detection instants. In particular, the signal-to-noise ratio is also the same for the signal of an X-ray quantum summed over successive pixels.

Hitherto the noise was taken into consideration if exactly one X-ray quantum, that is to say the luminescence centers of a single X-ray quantum, within a pixel were photostimulated. However, the absorption of the X-ray quanta is a statistical process that is subject to Poisson statistics. In other words, if on average dn X-ray quanta are sampled per time interval dt with the X-ray dose remaining the same on average, the number of said quanta fluctuates by the square route of dn. This number of X-ray quanta per time interval dn/dt corresponds to the effective number $N_{eff}$ of the X-ray quanta which is detectable by means of an ideal sampling method in a first time interval having the duration $\Delta t_I$. Therefore, $dn/dt=N_{eff}/\Delta t_I$ holds true. The detected total signal therefore results from integration of the partial signals over the time t, over which a pixel is sampled as:

$$S_{tot} = \int S(t) dn \quad (4)$$
$$= \int_0^{\Delta t_I} S(t) \frac{dn}{dt} dt$$
$$= \frac{N_{eff}}{\Delta t_I} \int_0^{\Delta t_I} S(t) dt$$
$$= N_{eff} \bar{S}.$$

The total variance $\sigma_{tot}^2$ in the signal level results if the variances of the individual signals $\sigma^2=S(t)^2 dn$ are summed as:

$$\sigma_{tot}^2 = \int S(t)^2 dn \quad (5)$$
$$= \int_0^{\Delta t_I} S(t)^2 \frac{dn}{dt} dt$$
$$= \frac{N_{eff}}{\Delta t_a} \int_0^{\Delta t_I} S(t)^2 dt$$
$$= N_{eff} \bar{S}^2 + \frac{N_{eff}}{\Delta t_a} \int_0^{\Delta t_I} (S(t)-\bar{S})^2 dt$$
$$= N_{eff} \bar{S}^2 + N_{eff} \sigma_S^2.$$

The total signal/noise ratio thus becomes:

$$(S/\sigma)_{tot} = \sqrt{\frac{N_{eff}}{1+\sigma_S^2/\overline{S}^2}} \quad (6)$$

The total signal/noise ratio is thus reduced relative to the ideally achievable signal/noise ratio, which corresponds to the root of the number of quanta that is effectively to be detected, by the factor $$\gamma = \sqrt{1+\sigma_S^2/\overline{S}^2} \quad (7)$$

Furthermore, it should be pointed out that the number of actually effectively detectable X-ray quanta $N_{eff}$ in a pixel differs from the actually absorbed number of X-ray quanta in the pixel $N_X$ by a factor based on the different conversion stages of the quantum signals in the detection process.

The case of an ideally focused laser beam was assumed in the above derivation. In real detectors, however, the laser beams are not ideally focused and also form a halo of specific size in the storage films as a result of light scattering. This has the effect that the luminescence signal (S) of an X-ray quantum that is formed over the luminescence centers is excited over a finite period of time and the time curve of the emitted signal results with erasure of information being disregarded, from the convolution of the excitation time function with S(t). As a result, the blurring of the pixel signals rises overall, as a result of which the image resolution becomes poorer. At the same time, however, the factor $\gamma$ decreases, since $\sigma_s$ is reduced.

Figure 2:
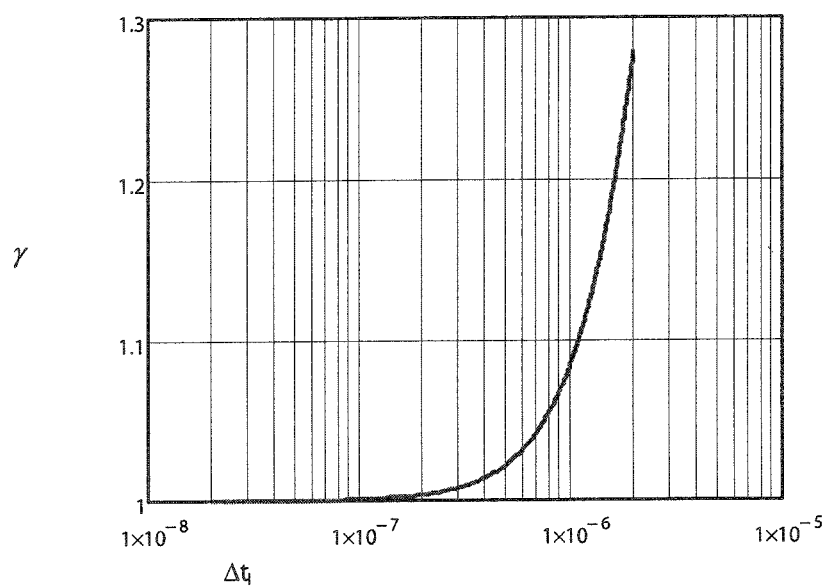
FIG. 2 shows a diagram in which the change in the factor $\gamma$ is plotted relative to the duration of a first time interval $\Delta t_I$.

FIG. 2 illustrates the change in the factor $\gamma$ with the first time interval $\Delta t_I$ for a time constant of the storage phosphor of $\tau=680$ ns for an ideally punctiform laser beam. It can clearly be discerned that the factor $\gamma$ increases as the length of the first time interval $\Delta t_I$ increases, which simultaneously means a reduction in the signal/noise ratio.

In order to compensate for this loss of signal/noise ratio, Neff would have to be increased by a factor that is just as large as $\gamma$. However, this is not readily possible in the human-medical application, since the X-ray dose should be kept as low as possible. Furthermore—and this also applies to technical applications—there is often the problem that the increase in X-ray dose is accompanied by an increase in the exposure time and hence an increase in the costs of the computer radiographic method.

In order to pursue the aim of the present invention, namely to obtain a higher signal/noise ratio of the digitized luminescence signal S and thus of the X-ray image with likewise a small superimposition of the luminescence signals of successive image pixels, it is therefore necessary to allow the above factor $\gamma$ to become almost one.

In order to improve the signal-to-noise ratio, there is an inventive basic concept which serves the purpose of minimizing $\sigma_s$ and has various technical realization embodiments. The inventive basic concept is based on the insight that firstly the temporal separation between the instants at which the luminescence signal S is detected, that is to say the digital measurement value is determined, has to be sufficiently large in order to avoid superimposition of luminescence signals S which are assigned to successive image pixels, and secondly ideally the same digital value is always detected for luminescence centers of identical type independently of the temporal position of the luminescence centers in the first time interval $\Delta t_I$.

This additionally pursues the aim of keeping low the apparatus outlay for the scanning method and hence the costs.

In order to achieve this object there is furthermore the observation that the decay curve of the luminescence signal S, with a sufficiently large interval for the digitization and transfer of the digital values to a controller that processes them further, falls with virtually its entire intensity within the first time interval $\Delta t_I$. Only a negligible small residue falls within a first time interval $\Delta t_I$ succeeding said first time interval $\Delta t_I$.

Figure 3:
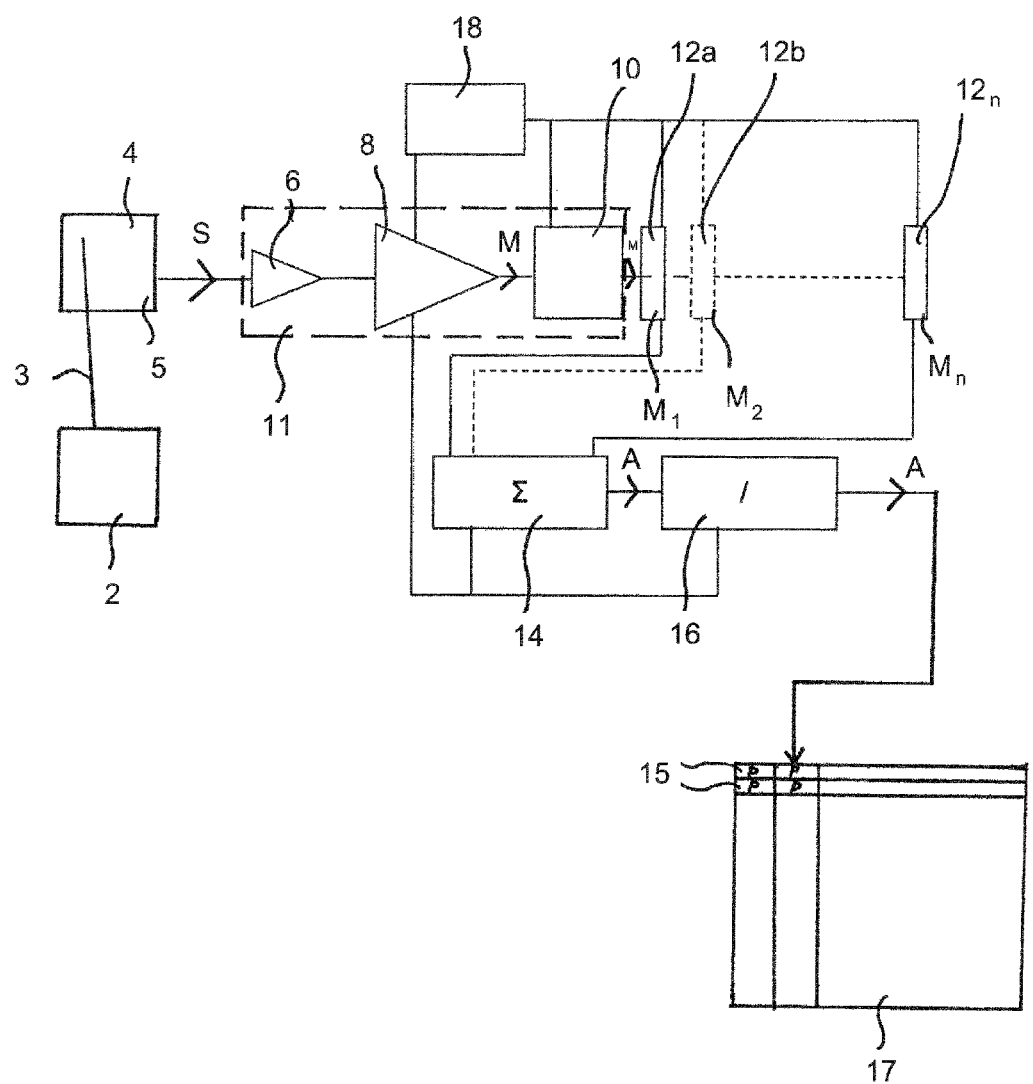
FIG. 3 shows a basic diagram of a first embodiment of the apparatus according to the invention.

FIG. 3 then illustrates a first embodiment of an apparatus for carrying out the method according to the invention.

By means of a photostimulation device 2, in this case a laser, a light beam 3 is generated, which is moved line by line over a storage medium 4. In this case, a light beam 3 is a narrow, narrowly delimited, collimated or focused radiation beam which propagates from the photostimulation device 2 to the storage medium 4 along a line and impinges ideally in punctiform fashion on the storage medium 4. Therefore, the light beam 3 firstly sweeps continuously along a line over the storage medium 4 and is then moved into a further line and in turn sweeps over the storage medium 4 along said further line. Overall, therefore, the storage medium 4 is thus scanned at a rapid scanning speed in each case along a line and at a slower scanning speed perpendicularly to the individual lines. As a result of photostimulation of the storage phosphor 5 contained in the storage medium 4, a luminescence signal S dependent on the image information contained in the storage phosphor 5 is generated. Said luminescence signal S is registered by a photodetector 6 and converted into a corresponding analog electrical signal.

By means of a sampling device 8, preferably a sample-and-hold amplifier, connected downstream of the photodetector 6, the electrical signal and hence the measurement values thereof are detected at specific time separations. In this case, the time separation, that is to say the second time interval $\Delta t_{II}$, is preferably dimensioned in such a way that it is less than the decay time constant of the storage phosphor. Consequently, the luminescence signal S or the electrical signal representing it is sampled with a significantly higher detection rate by comparison with the prior art.

Subsequently, the measurement values M obtained by the sampling device 8 are converted into digital measurement values M by means of an analog/digital converter 10 connected downstream of the sampling device 8. The photodetector 6, the sampling device 8 and the A/D converter 10 form a measuring device 11 by means of which the luminescence signal S is detected.

The digital measurement values M are then buffer-stored in memory components 12a to 12n. The n stored digital measurement values $M_1, M_2, \ldots M_n$ are subsequently added with the aid of a summation element 14 to form an output value A. The output value A then serves as a basis for determining a pixel value P of an image pixel 15 of a digital image 17, wherein exactly one output value A is assigned to each image pixel 15 of the image 17. This process is then repeated until, by means of the photostimulation device 2, all desired regions of the storage medium 4 have been swept over and the corresponding image information items have been read out. Therefore, in each case successively, a defined number n of digital measurement values $M_1, M_2, \ldots M_n$ are buffer-stored in the memory 12 and added by means of the summation element 14 to form an output value A. The addition is then followed in turn by the storage of n further digital measurement values $M_1, M_2, \ldots M_n$, from which an output value A is then once again determined. Said output value A is therefore determined over a first time interval $\Delta t_I$ corresponding to n times the duration of the second time interval $\Delta t_{II}$.

By way of example, FIG. 3A illustrates a luminescence signal against time, said signal being detected in the second time intervals $\Delta t_{II}$. The output value A is determined over a first time interval $\Delta t_I$ having five times the length of $\Delta t_{II}$. Consequently, n=5 in this case.

As a result of the short duration of the second time interval $\Delta t_{II}$ relative to the first time interval $\Delta t_I$, that is to say the time separations in which the measurement values M of the luminescence signal S are detected, the number n of digital measurement values $M_1, M_2, \ldots M_n$ to be added can then be arranged such that the duration of the first time interval $\Delta t_I$ corresponds to the duration of the first time interval $\Delta t_I$, as in the case of a method known from the prior art, that is to say is distinctly above one microsecond.

Before the output value A is forwarded to an image processing device (not shown) the output value A is divided, by means of a division device 16 connected downstream of the summation element 14, by a constant factor, preferably equal to the number n of measurement values $M_1, M_2, \ldots M_n$ added to form an output value A, in order that the maximum output value A is limited to a specific bit width, such as e.g. 16 bits, which can be processed further and stored particularly simply in computer systems. As a result of the addition of n digital measurement values M within the first time interval $\Delta t_I$, the digitization depth of the output value A is automatically increased again, such that it is possible to detect a large output value range than corresponds to the digitization depth of the analog/digital converter 10 alone. In order to control the sequence of the method according to the invention, a control unit 18 connected to the components described above is used.

Figure 4:
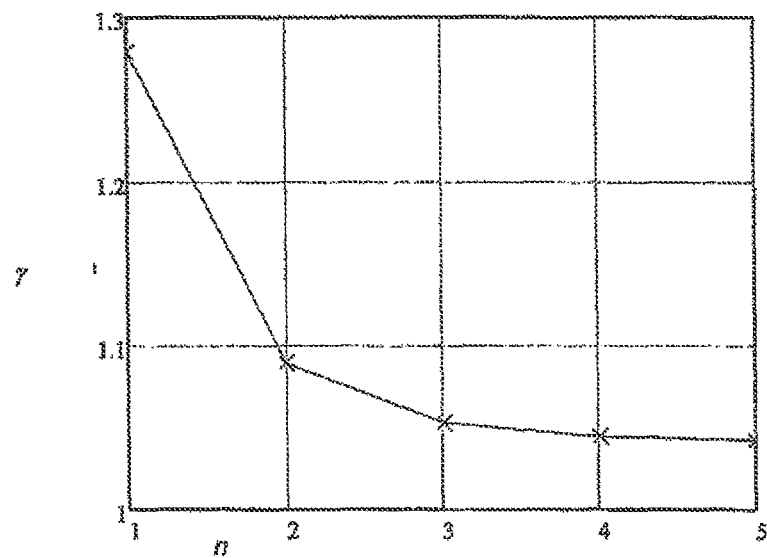
FIG. 4 shows a diagram in which the change in the factor $\gamma$ is plotted against the number of added digital measurement values.

FIG. 4 then illustrates the change in the factor γ in the case of a first time interval $\Delta t_I = 2 \cdot 10^{-6}$ s and a time constant of $\tau = 680$ ns for an increasing number n of the digital measurement values M added in a first time interval $\Delta t_I$.

It is evident that the factor γ decreases with an increasing number n of added measurement values in a first time interval $\Delta t_I$ and, consequently, the signal/noise ratio for the output value A of an X-ray quantum increases.

This increase in the signal/noise ratio is also the case if, instead of the individual pixel signal, the entire signal which is summed over all following pixels and which is initiated by an X-ray quantum is considered.

Figure 5:
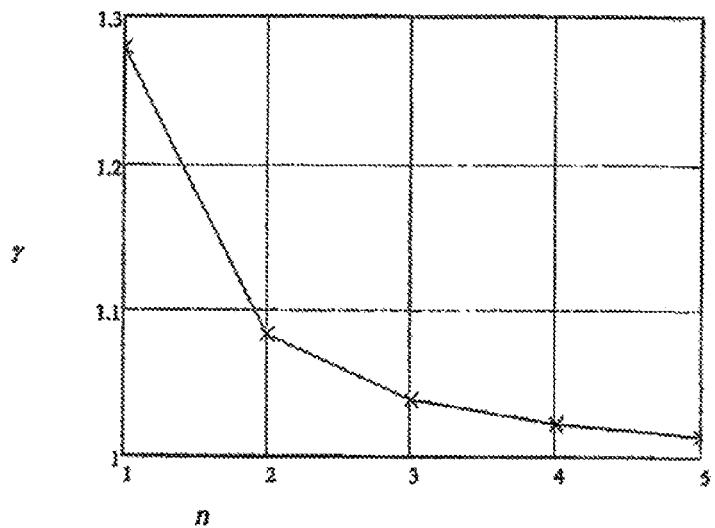
FIG. 5 shows a further diagram in which the factor $\gamma$ is plotted against the number of added digital measurement values.

In order to show this, FIG. 5 illustrates the change in the factor γ in the case of a first time interval $\Delta t_I = 2 \cdot 10^{-6}$ s and a time constant of $\tau=680$ ns for an increasing number n of added digital measurement values and signals which are summed over all following pixels and which are initiated by quanta in a first time interval $\Delta t_I$.

It should be pointed out at this juncture that the improvements in the signal/noise ratio by means of the method according to the invention leave the resolution of the detected X-ray image practically unchanged and therefore distinctly improve the image result.

As already explained, the actual number $N_X$ of absorbed X-ray quanta whose luminescence centers are swept over by the laser beam in a first time interval $\Delta t_I$ is reduced by virtue of the number of photoelectrons $N_e$, which is limited on account of a limited number of the storage centers produced per X-ray quantum and their incomplete read-out and the incomplete collection and conversion of the light quanta, to the effective number $N_{eff}$ of quanta that influences the measured signal/noise ratio. This relationship is considered below, since the value of $N_{eff}$ is influenced with an increasing number n of added digital measurement values in a second time interval.

For a scanner, the number of photoelectrons primarily generated overall during the registration in the photodetector for an X-ray quantum absorbed in the storage film will assume a specific value $N_e$. Of this number, the sampling device 8 will only detect on average a number $N_{edet}$ dependent on over which third time interval $\Delta t_{III}$ the sampling device 8 detects the electrical signal and how long the first time interval $\Delta t_I$ is. The rate of the photoelectrons generated by the photostimulated luminescence after the photostimulation by the photostimulation device 2 is then, for an X-ray quantum with respect to time t $$\frac{dN_e}{dt}(t) = \frac{N_e}{\tau} e^{-t/\tau} \qquad (8)$$

The average number of photoelectrons detected in a first time interval is, according to the prior art, $$N_{edet} = \frac{1}{\Delta t_I} \int_0^{\Delta t_I} \int_t^{t+\Delta t_{III}} \frac{N_e}{\tau} e^{-t'/\tau} dt' dt \qquad (9)$$

$$= \frac{1}{\Delta t_I} \int_0^{\Delta t_I} N_e (e^{-t/\tau} - e^{-(t+\Delta t_{III})/\tau}) dt$$

Figure 6:
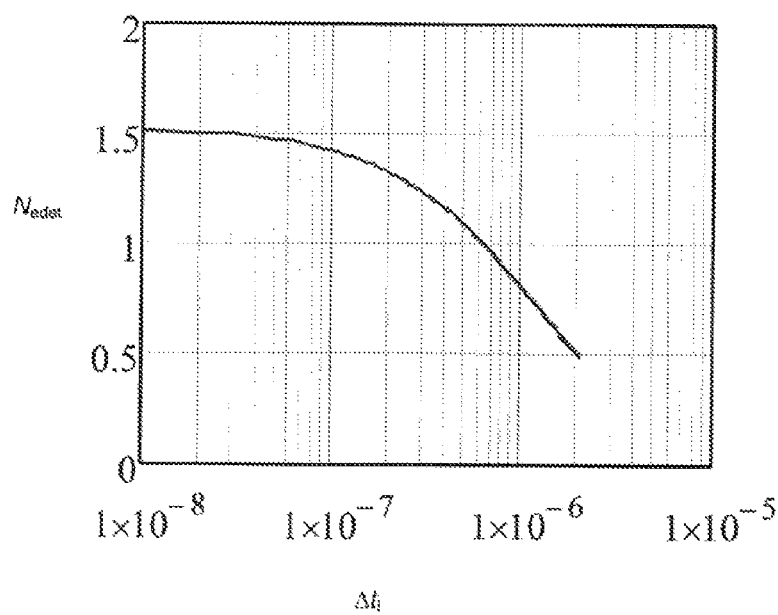
FIG. 6 shows a diagram in which the number of detected photoelectrons is plotted as a function of the duration of the first time interval $\Delta t_I$.

For $N_e=6$ and the third time interval $\Delta t_{III}=200$ ns, this results e.g. in the average number of detected photoelectrons that is illustrated in FIG. 6 in a first time interval $\Delta t_I$ as a function of the duration $\Delta t_I$ thereof.

The signals sampled in a pixel of $N_X$ absorbed X-ray quanta produce overall $N_{etot} = N_X \cdot N_{edet}$ detected photoelectrons. The number thereof satisfies Poisson statistics and yields a noise component $$R_e = \sqrt{N_{etot}} = \sqrt{N_X N_{edet}} \qquad (10)$$

A further component arises as a result of the noise component of the number of X-ray quanta per pixel $$R_X = \sqrt{N_X} \qquad (11)$$

which, multiplied by $N_{edet}$, occurs in the form of electrons as a further noise component $R_{eX}$ in the photoelectron signal:

$$R_{eX} = \sqrt{N_X} \cdot N_{edet} \qquad (12)$$

These two noise components $R_e$ and $R_{eX}$ are superimposed to form total noise $$R_{etot} = \sqrt{N_X N_{edet}^2 + N_X N_{edet}} \qquad (13)$$

From this, the signal-to-noise ratio of the sampled photoelectrons without taking account of the exponential signal decrease of the storage phosphor, is calculated as $$(S/R)_{etot} = \sqrt{\frac{N_X}{1 + 1/N_{edet}}} \qquad (14)$$

A comparison with the S/N ratio of the X-ray quanta $$(S/R)_X = \sqrt{N_X} \qquad (15)$$

shows that the number of effectively detectable X-ray quanta in the case of conversions into photoelectrons is given by $$N_{eff} = \frac{N_X}{1 + 1/N_{edet}} \qquad (16)$$

Consequently, in the sampling method corresponding to the prior art, the S/N ratio without taking account of the exponential decrease in the luminescence signal S is reduced by the detection of the photoelectrons by the factor $$\alpha = \sqrt{1 + 1/N_{edet}} \quad (17)$$

Figure 7:
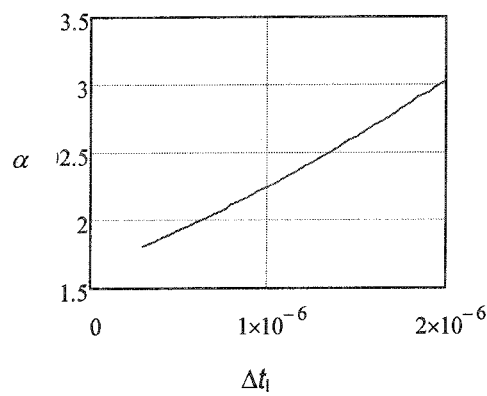
FIG. 7 shows a diagram in which the dependence of the factor α on the duration of the first time interval $\Delta t_I$ is plotted.

The factor α illustrated in FIG. 7 results from this for $N_e=6$ and the third time interval $\Delta t_{III}=200$ ns as a function of the duration of the first time interval $\Delta t_I$.

It is evident that the factor α increases significantly as the duration of the first time interval $\Delta t_I$ increases.

Therefore, for the sampling method corresponding to the prior art, overall a decrease in the S/N ratio by the factor αγ arises, with respect to the ideal case.

Figure 8:
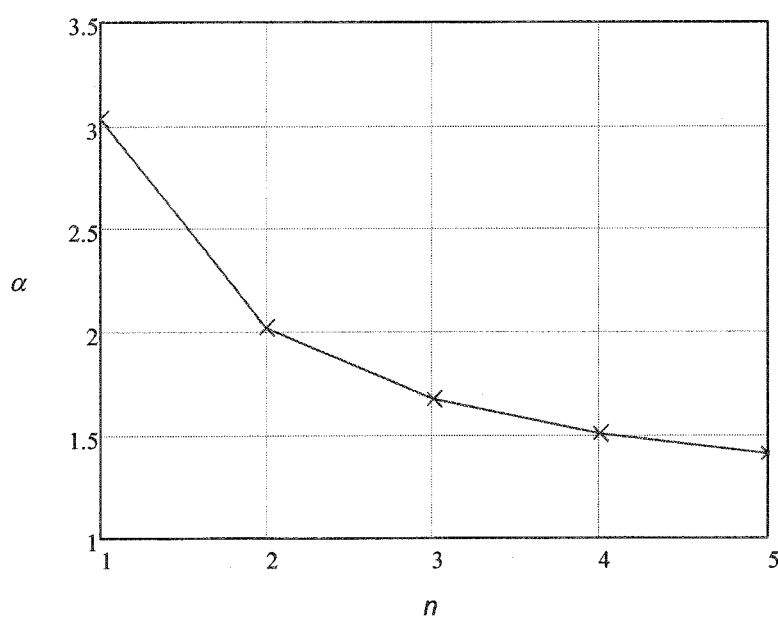
FIG. 8 shows a diagram illustrating the factor α as a function of the number of added digital measurement values.

If, by contrast, with the method according to the invention, n digital values are added in a first time interval $\Delta t_I$, $N_{edet}$ increases by the factor n relative to the prior art in the case of the method according to the invention, as a result of which in turn α decreases and the total S/N ratio increases. The decrease in α is illustrated in FIG. 8 in the case of a first time interval $\Delta t_I=2\cdot10^{-6}$ s and a time constant of τ=680 ns for an increasing number n of added digital measurement values M.

Figure 9:
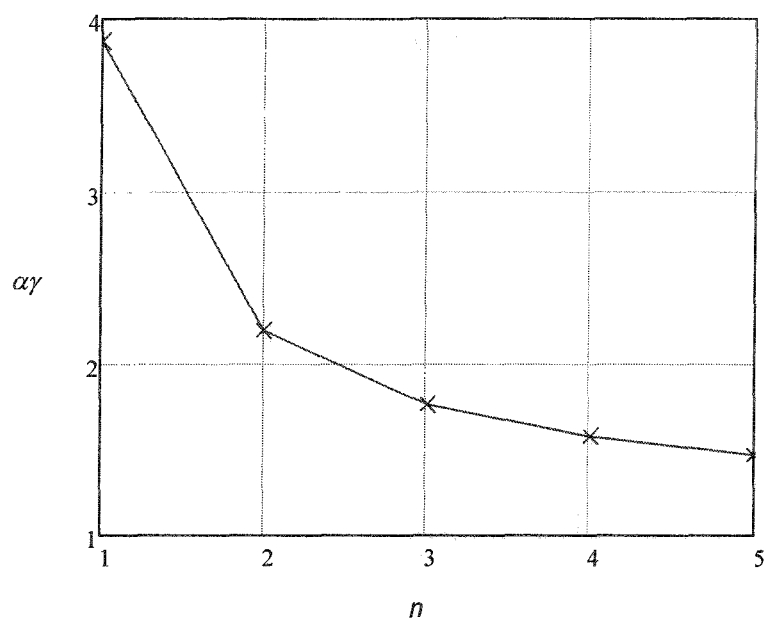
FIG. 9 shows a diagram in which the dependence of the factor αγ is plotted relative to the number of added digital measurement values.

Overall, for the method according to the invention under identical conditions, the decrease in the factor αγ as illustrated in FIG. 9 arises with an increasing number n of the digital measurement values M added in a first time interval $\Delta t_I$.

Figure 10:
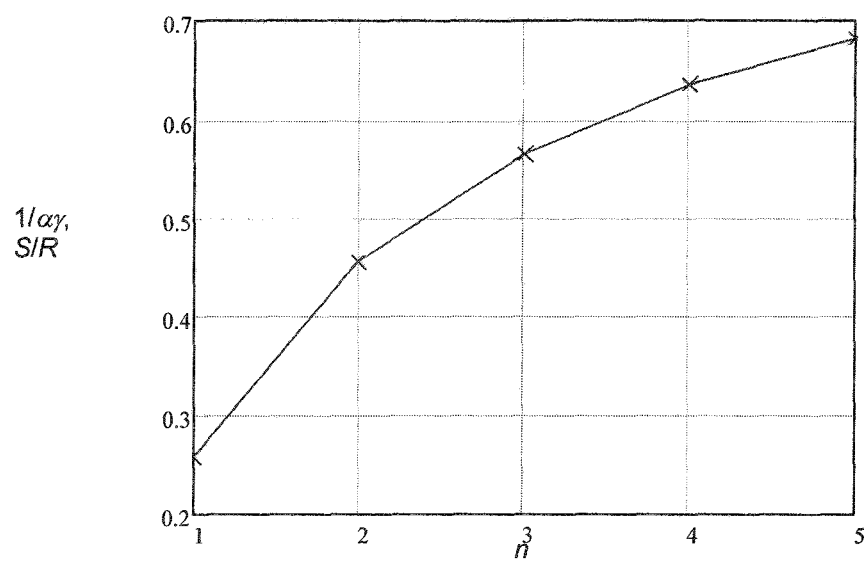
FIG. 10 shows a diagram illustrating the increase in the signal-to-noise ratio upon application of the method according to the invention relative to the number of added digital measurement values.

FIG. 10 illustrates the increase in the signal/noise ratio with the method according to the invention under the otherwise identical conditions with an increasing number n of the added values in a first time interval $\Delta t_I$.

Figure 11:
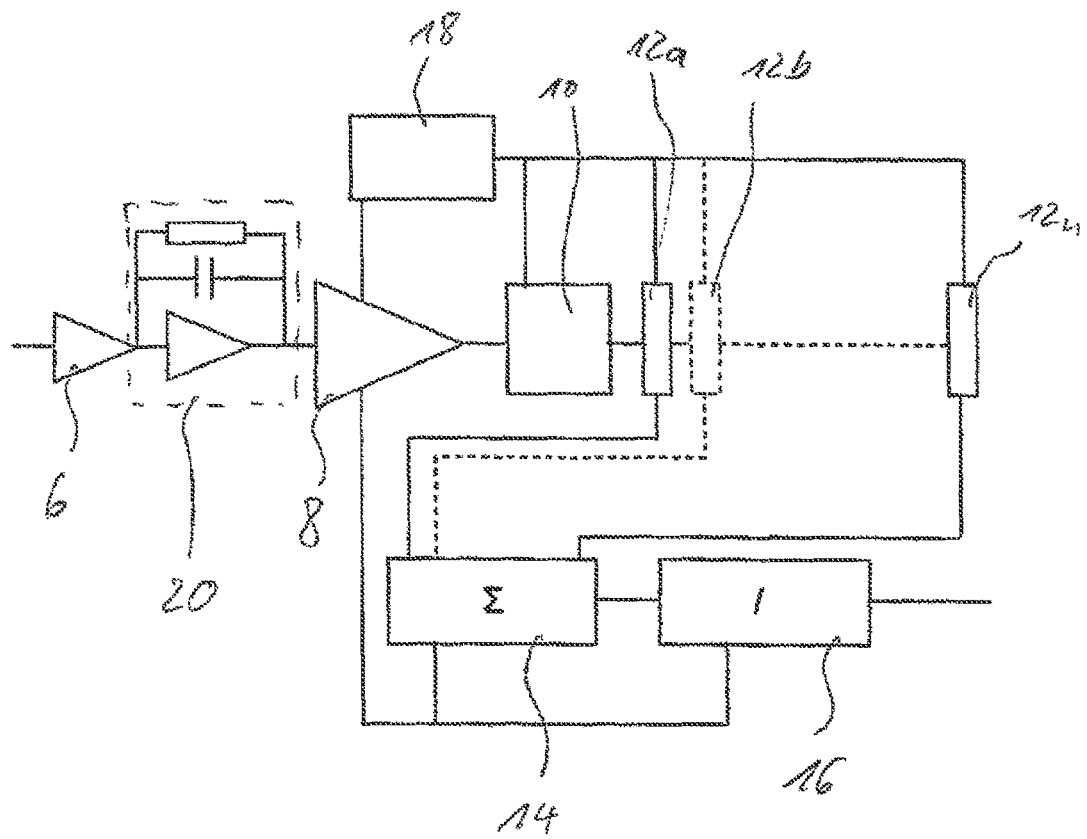
FIG. 11 is a block diagram showing an apparatus comprising a filter.

Since the width of the third time interval $\Delta t_{III}$ is fixedly predetermined in general by the sampling device 8, a further embodiment of the invention, as illustrated in FIG. 11, provides for the analog electrical signal detected by the sampling device 8 to be averaged beforehand over an even longer temporal range by means of an analog filter 20 being connected upstream, in order to be able to detect even more photoelectrons. This can be done according to the invention using a low-pass filter, for example, whose reciprocal value of the cut-off frequency, corresponding to the time constant $\tau_T$, is even longer than $\Delta t_{III}$ and of the order of magnitude of $\Delta t_I/n$. One specific, simple form of realization can be a first-order low-pass filter.

Such a filter 20 also has an effect, of course, on the decay of the measurement signal of a quantum. While the measurement signal without the filter 20 consists of the exponential decrease with the time constant τ, with the filter 20 the measurement signal consists of said exponential decrease convolved with the impulse response of the low-pass filter, which is likewise an exponentially decreasing function with the time constant $\tau_T$.

In accordance with one preferred embodiment of the invention, however, the time constant of the low-pass filter $\tau_T$ is significantly less than the decay time constant τ of the storage phosphor. The convolution of these two exponentially decreasing functions has, apart from a constant prefactor, a temporal profile corresponding to the form $$S_F = e^{-t/\tau}(1 - e^{-t/\tau T + t/\tau}) \approx e^{-t/\tau}(1 - e^{-t/\tau T}) \approx e^{-t/\tau} \quad (18)$$

and thus alters the resolution of the system only insignificantly, but—as described above—increases the signal/noise ratio. This is because the significantly shorter time duration of the third time interval $\Delta t_{III}$ in comparison with the decay time constant τ is increased by convolution with the impulse response of the low-pass filter, such that correspondingly more photoelectrons are detected. In the case of very short third time intervals $\Delta t_{III}$ in comparison with the time constant of the low-pass filter $\tau_T$, the third time interval $\Delta t_{III}$ is effectively increased to the time constant of the low-pass filter $\tau_T$.

In principle, however, it is also possible to use other analog filters which average over a time duration $\tau_T$ which is greater than the third time interval $\Delta t_{III}$. These include e.g. even higher-order low-pass filters. Filters 20 having a Gaussian impulse response have the advantage here of a particularly rapid rise and fall and thus particularly little influence on the decay of the measurement signal.

Figure 12:
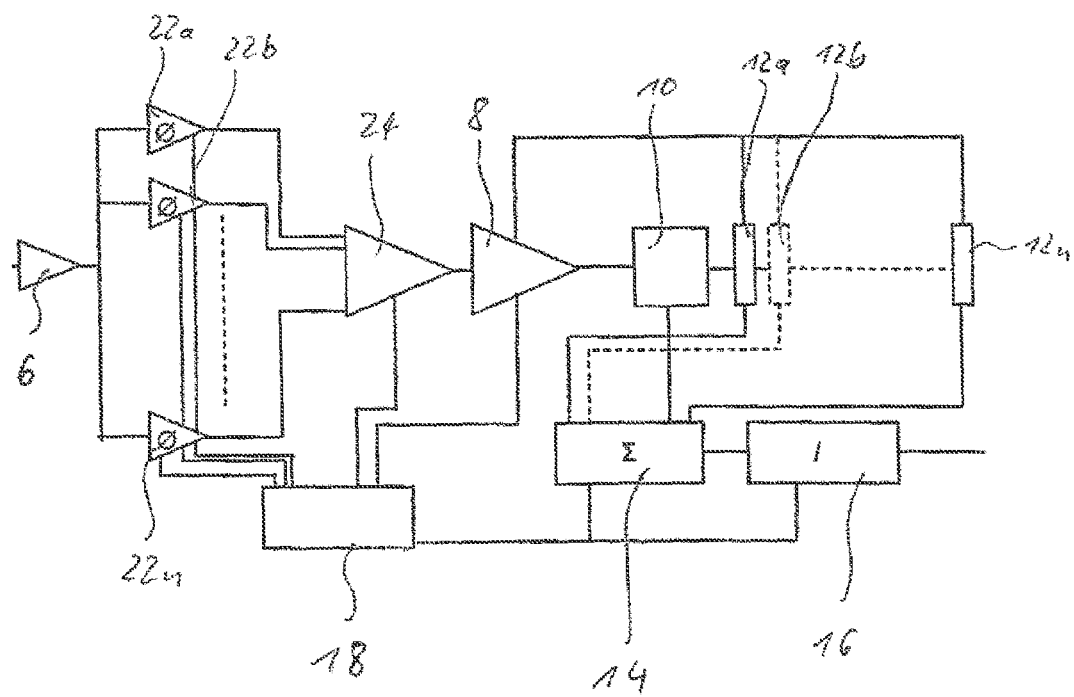
FIG. 12 is a block diagram showing an apparatus wherein averaging units are connected downstream of the photodetector.

A further embodiment illustrated in FIG. 12 provides for forming an average value of the analog electrical signal before detection by means of the sampling device 8. However, conventional analog averaging units 22 based on integration circuits have the disadvantage of a relatively small bandwidth and relatively long reset time, and so this form of realization is inferior to that described above with a low-pass filter.

The disadvantage of the long reset time of analog averaging circuits, which limits the second time interval $\Delta t_{II}$, that is to say the time separation $\Delta t_I/n$, toward short times, can be compensated for, however, by a plurality of averaging units 22a to 22n operating in parallel which are successively started with a time offset $\Delta t_I/n$ and are subsequently stopped again respectively after the time $\Delta t_I/n$, in order to form the respective average value. In accordance with FIG. 12, for this purpose, a multiplexer 24 having n multiplexed inputs is connected upstream of the sampling device 8, said inputs being connected to the outputs of the n averaging units 22a to 22n. As soon as the first average value of the first averaging unit 22a has been formed, this is switched by the multiplexer 24 to the input of the sampling device 8, the sampling device 8 is triggered and the analog measurement value M is digitized. At the same time, the second averaging unit 22b is started. The first averaging unit 22a is subsequently reset. Thus, the measurement values M of the n averaging units which respectively form the average value over n mutually adjacent second time intervals $\Delta t_{II}=\Delta t_I/n$ are detected successively. The resetting of the first averaging unit 22a is ended if the sampling device 8 has detected the signal of the n-th averaging unit. At the same time, the first averaging unit 22a is started again.

As a result of the exponential decay and the impulse responses of the filters 20, the resolution of the measured X-ray image in the rapidly detected line direction is reduced relatively to the detection perpendicularly to the line direction, which is effected significantly more slowly, all the more the shorter the duration of the first time interval $\Delta t_I$. Furthermore, in the frequency domain, the maximum resolution in line pairs per mm is limited by the Nyquist frequency $$f_N = \frac{1}{2\Delta t_I} \quad (19)$$

Furthermore, the following relationship holds true in the case of equidistant first time intervals $\Delta t_I$ and signal detection over the entire pixel size for the modulation transfer function (MTF)

$$MTF_{sampling}(f) = \sin(\pi \cdot f \cdot \Delta t_I)/(\pi \cdot f \cdot \Delta t_I) \quad (20)$$

Correspondingly, at the Nyquist frequency $f_N$, frequency amplitudes are attenuated by the factor $2/\pi=0.636\ldots$. As a result of the exponential decay of the photostimulated luminescence signal, a further attenuation of the high spatial frequencies takes place in the fast detection direction, said attenuation being all the more pronounced, the shorter the first time interval $\Delta t_I$. In order then to achieve a similar attenuation of the high spatial frequencies in the fast detection direction (line direction), and also in the slow detection direction (perpendicular to the line), in accordance with a further preferred embodiment of the invention the first time interval in the fast line direction in the space domain $\Delta x = v_{scan} \cdot \Delta t_I$ is reduced ($v_{scan}$=laser speed in the line direction) and the first time interval $\Delta t_I$ is correspondingly shortened. In the case of a value $\Delta x$ which corresponds for example to half the size of a pixel $\Delta y$ perpendicular to the fast scanning direction, it is thus possible to reduce the attenuation at the original Nyquist frequency in the x direction by the factor $(\sin(\pi/4)/(\pi/4))/0.636 = 0.900/0.636 = 1.41 = \sqrt{2}$, and thus to improve the resolution by approximately 41%.

In general, as a result of more frequent sampling in the line direction, $MTF_{sampling}$ is increased and the attenuation at the original Nyquist frequency is reduced and, consequently, the resolution in the fast scanning direction is increased. In this way, it is possible to achieve a resolution that is approximately the same in the fast and slow detection directions, as is often desired in practice.

The invention claimed is:

1. A method of reading out image information stored in a storage phosphor of a storage medium, the method which comprises:
    moving a light beam along lines over the storage medium line by line in order to generate a luminescence signal by photostimulation of the storage phosphor, within a first time interval;
    determining an output value from the luminescence signal by addition of a plurality of sequential, equally weighted measurement values of the luminescence signal taken during second time intervals lying within the first time interval;
    wherein the storage phosphor has a given decay time constant and each of the second time intervals are less than three times the decay constant of the storage phosphor; and
    determining from the output value a respective digital image pixel value.

2. The method according to claim 1, wherein the second time interval is shorter than the decay time constant of the storage phosphor.

3. The method according to claim 1, wherein determining the output value further comprises:
    detecting the luminescence signal with a photodetector and converting the luminescence signal into an analog electrical signal; sampling the analog electrical signal forming analog measurement values; and
    converting the analog measurement values into digital measurement values by way of an A/D converter.

4. The method according to claim 1, further comprising dividing the output value by a factor in order to limit the output value to a maximum value.

5. The method according to claim 3, further comprising filtering the electrical signal before sampling.

6. The method according to claim 5, wherein the filtering step comprises low-pass filtering.

7. The method according to claim 6, wherein the low-pass filtering comprises a first-order low-pass filter or a low-pass filter having a Gaussian impulse response.

8. The method according to claim 3, further comprising filtering the electrical signal before sampling by way of a filter having an impulse response that is shorter than a decay time constant of the storage phosphor.

9. The method according to claim 1, which comprises moving the light beam over the storage medium more rapidly in a line direction over the storage medium than in a direction perpendicular to the line direction, and detecting the measurement values in a space domain at a smaller distance in the line direction than in the direction perpendicular to the line direction.

10. An apparatus for reading out image information stored in a storage phosphor of a storage medium, the apparatus comprising: a photostimulation device for photostimulating the storage phosphor by moving a light beam along lines of the storage medium and scanning the storage medium line by line and generating a luminescence signal; a measuring device configured for measuring luminescence emitting from the storage medium sequentially one after another by detecting the luminescence signal within a second time interval lying within a first time interval and outputting a measurement value; a summation element for determining a respective output value by adding a plurality of equally weighted, sequentially acquired measurement values of the luminescence signal detected during the second time interval; and an A/D converter for determining, from the output value, a respective digital image pixel value; and wherein the storage phosphor has a given decay time constant and each of the second time intervals are less than three times the decay constant of the storage phosphor.

11. The apparatus according to claim 10, wherein the measuring device comprises: a photodetector configured for converting the registered luminescence signal into an analog electrical signal; a sampling device connected to receive the electrical signal from said photodetector; wherein the A/D converter is connected downstream of said sampling device.

12. The apparatus according to claim 10, which further comprises a division device connected downstream of said summation element and configured for dividing the output value by a given factor.

13. The apparatus according to claim 12, which further comprises a filter connected upstream of said sampling device.

14. The apparatus according to claim 13, wherein said filter is a low-pass filter.

15. The apparatus according to claim 14, wherein said filter is a first-order low-pass filter or a low-pass filter having a Gaussian impulse response.

16. The apparatus according to claim 13, wherein said filter has an impulse response that is shorter than a decay time constant of the storage phosphor.

17. The apparatus according to claim 10, which further comprises a plurality of averaging units connected downstream of said photodetector, and a multiplexer connecting said averaging units to said sampling device.

* * * * *